3,766,235
HYDROXAMIC ACID DERIVATIVES OF ALPHA-AMINOOXY-CARBOXYLIC ACIDS
Lajos Kisfaludy, Agnes Patthy, nee Lukats, Lajos Dancsi, Gyorgy Fekete, and Istvan Szabo, Budapest, Hungary, assignors to Richter Gedeon Vegyeszeti Gyar Rt., Budapest, Hungary
No Drawing. Filed Dec. 28, 1970, Ser. No. 102,099
Claims priority, application Hungary, Dec. 29, 1969, RI–384
Int. Cl. C07c *119/00*
U.S. Cl. 260—453 R  2 Claims

ABSTRACT OF THE DISCLOSURE

α-Aminooxy-alkyl carbonyl hydroxamic acid derivatives having tuberculostatic activity and corresponding to the general formula

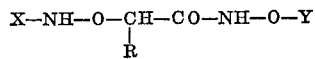

(I)

wherein
X represents a hydrogen atom or an acyl group,
R represents a hydrogen atom or an unsubstituted or substituted alkyl-, aralkyl or aryl radical,
Y represents an unsubstituted or substituted $C_{1-15}$ alkyl, aralkyl or aryl group or a heterocyclic radical,
as well as the pharmaceutically acceptable acid addition salts thereof.

---

This invention relates to new hydroxamic acid derivatives of alpha-aminooxy-carboxylic acids having tuberculostatic activity, as well as to a process for the preparation thereof.

The earliest representative of the alpha-aminooxy carboxylic acids, that is the aminooxy-acetic acid is known since the end of the last century [A. Werner: Ber. 26 1567 (1893), Ber. 27 3350 (1894)], but its bacteriostatic activity has been described only in 1948 [C. B. Favour: J. Bakteriol. 55 1 (1948)]. There were also prepared some derivatives of the above compound [A. Frank, K. Riedl: Mh. Chem. 92, 225 (1961)], but no data are reported concerning to their bacteriostatic activity. Some other aminooxy-derivatives have also been prepared [M. Hale et al.: J. Chem. Soc. 1960 225; P. Mamalis et al.: J. Chem. Soc. 1960 229; E. Testa et al.: Helv. Chim. Acta 46 766 (1963); P. Mamalis et al.: J. Med. Chem. 6 684 (1965); V. Markova et al.: Chim. Farm. Zh. 3 13 (1969)] and their bacteriostatic activity has been investigated [S. A. Price et al.: Brit. J. Pharm. 15 243 (1960)], but there are found no compounds having a marked activity against *Mycobacterium tuberculosis.*

Now we have found that the new alpha-aminooxycarboxylic acid derivatives of the general Formula I

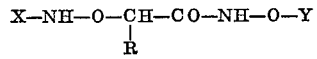

(I)

wherein
X represents a hydrogen atom, an acyl group,
R represents a hydrogen atom or an unsubstituted or substituted alkyl, aralkyl or aryl radical,
Y represents an unsubstituted or substituted $C_{1-15}$ alkyl, aralkyl or aryl group or a heterocyclic radical as well as the pharmaceutically acceptable acid addition salts of the compounds of the General Formula I and/or their optically active isomers possess a very advantageous tuberculostatic activity.

In the majority of the compounds of the General Formula I, X represents hydrogen, but X may also stand for an acyl group, which latter may contain in some cases a moiety capable to salt-formation. The compounds of the General Formula I, wherein R stands for hydrogen, and hydroxamic acid derivatives of aminooxy-acetic acid. Those compounds of the General Formula I, wherein R represents a group other than hydrogen, are hydroxamic acid derivatives of alpha-aminooxy carboxylic acids having two or more optically active isomers. Y represents preferably an appropriate substituted benzyl group, but Y may also stand for a radical having more carbon atoms, e.g. for a dodecyl group.

There were no data reported in the literature referring to the preparation of the compounds having the General Formula I, not even in the collective report of A. O. Ilvespää and A. Marxer [Chimia 18 1 (1964)].

The compounds of the General Formula I can be prepared preferably as described in the following:

An alpha-aminooxy-carboxylic acid derivative of the General Formula II

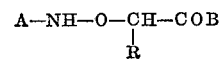

(II)

wherein
A represents an acyl group, or when in the final product X represents a hydrogen atom, A is a radical capable of temporarily protecting the amino group, e.g. a carbobenzoxy, or t-butoxycarbonyl radical,
R has the same meanings as stated above,
B represents a hydroxyl group or a residue of an activated carboxyl group, e.g. a pentachlorophenoxy, halo or $N_3$ group is reacted with a hydroxylamine derivative of the General Formula III $$H_2N—O—Y \qquad (III)$$

wherein Y has the same meanings as stated above, and the thus-obtained compound of the General Formula IV

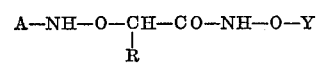

(IV)

wherein A, R and Y have the same meanings as stated above, is converted, optionally after splitting off the protective group in a way known per se, into a compound of the General Formula I, or a pharmaceutically acceptable acid addition salt thereof .

The thus-obtained compounds of the General Formula I, wherein X represents hydrogen, can be acylated on their amino group in a way known per se. These acyl-derivatives can also be prepared, from the starting compounds of the General Formula II, wherein A stands for the appropriate acyl group. If an optically active compound of the General Formula II is used as starting material, optically active compounds of the General Formulae IV and I are obtained. In those cases, when the starting compound of the General Formula II is optically inactive, the obtained end-products of the General Formula I can be resolved according to usual techniques into their optically active forms.

The reaction of the compounds of the General Formulae II and III is usually carried out in the presence of an organic solvent at room temperature, and the progress of the reaction may be monitored by thin layer chromatography. The reaction mixture can be easily worked up; the method of working up depends on the nature of the B substituent. The excess of the starting compounds can be removed by extraction, and the obtained compound of the General Formula IV can be isolated by recrystallization from an organic solvent.

The compounds of the General Formula I can be prepared from the compounds of the General Formula IV by several methods; the actual method depends on the. character of the protective groups. If the protective group is split off with a mixture of hyrdobromic acid and glacial acetic acid or with a mixture of hydrochloric acid and ethyl acetate, the corresponding salt of the obtained compound of the General Formula I can be easily separated, because these compounds are practically insoluble in ether.

According to a particularly preferred method, the amino group of the compounds of the General Formula II is protected with a t-butoxycarbonyl or a carbobenzoxy radical, and the carboxyl group of the compounds of the General Formula II is activated with dicyclohexyl-carbodiimide, or by converting the free acid into its pentachlorophenyl ester. In this way the compounds of the General Formula IV can be prepared with very good yields; and they can be converted into the end-products of the General Formula I by treating them with an acid. The end-products of the General Formula I are obtained in the form of the free bases or their acid addition salts, depending on the circumstances of the reaction. The salts can be converted into the free base in a way known per se, while the free bases can be converted into their acid addition salts according to known procedures. Among the salts the pharmaceutically acceptable acid addition salts are preferred.

According to the in vitro pharmacological tests, a great number of the compounds of the General Formula I exert a marked inhibiting activity against the growth of the *Mycobacterium tuberculosis* $H_{37}R_Y$ strain, as well as other strains resistant to isonicotinic acid hydrazide, p-amino-salicylic acid and Streptomycin. The inhibiting activity of the compound prepared according to Example 1 is particularly advantageous; the minimal inhibitory concentration of this compound is below 1 γ/ml. The anti-tuberculotic effect of this compound has also been proved by in vivo experiments carried out in guinea pigs. The animals have been infected with 0.01 mg./kg. body-weight doses of the above bacterium, and they have been treated with 5 mg./kg. doses of the active agent. The infection has been carried out subcutaneously, and the treatment was continued for 90 days. At the end of this period the animals have been sacrificed, and the lesions of five organs have been registered. The degree of the lesion has been marked with a number between 0 and 5, depending on its seriousness. The average value obtained in the control-group was 9.8, while this value was 5.4 in the case of the medicamented animals. Accordingly, the effectiveness of this compound corresponds to that of the tuberculostatics of second order.

The compounds of the General Formula I can be administered in the therapy orally and/or parenterally, in the form of tablets, coated tablets, injections, infusions or suppositories. The average daily dose in adults is 7 to 50 mg./kg.

The invention is further elucidated by the aid of the following, non-limiting examples. The melting points have been determined in a Dr. Tottoli-type apparatus. The thin layer chromatographic evaluations have been carried out on a "Kieselgel nach Stahl" adsorbent, in a 1:1:8 mixture of n-hexane, glacial acetic acid and chloroform, and the development has been carried out by the $Cl_2$+toluidine method. The structure of the products has been proved by IR and NMR spectroscopy.

EXAMPLE 1

Step A.—N-(N'-carbobenzoxy-aminooxy-acetyl)-O-p-chlorobenzyl-hydroxylamine

Method a/1: 4.53 g. (0.01 mM.) of N-carbobenzoxy-aminooxy-acetic acid pentachlorophenyl ester are dissolved in 50 ml. of abs. dioxane, and 1.94 g. (0.01 mM.) of O-p-chlorobenzyl-hydroxylamine HCl are added. 2.76 ml. (0.02 mM.) of abs. triethylamine are added dropwise to the above solution with cooling and stirring. The solution is stirred for additional 3 hours at room temperature, thereafter 0.18 ml. of dimethylaminoethylamine are added to the mixture. After 30 minutes the solvent is distilled off under reduced pressure. The residue is treated with the mixture of 30 ml. of ethylacetate and 10 ml. of 1 N hydrochloric acid, the ethylacetate solution is separated, washed with 2 x 10 ml. of 1 N hydrochloric acid, and 2 x 10 ml. of water and dried. The solution is evaporated to dryness under reduced pressure, and the residue is crystallized from ethyl acetate. 2.83 g. (78%) of N-(N'-carbobenzoxy-aminooxy-acetyl) - O - p-chlorobenzyl-hydroxylamine are obtained, M.P.: 123–124° C., $R_f$: 0.52.

*Analysis.*—Calculated (percent): C, 56.1; H, 4.7; N, 7.7; Cl, 9.8. Found (percent): C, 56.1; H, 4.7; N, 7.6; Cl, 9.8.

Method a/2: 13.3 g. (68.5 mM.) of O-p-chlorobenzyl-hydroxylamine HCl are dissolved in 150 ml. of abs. pyridine, and 9.45 ml. (68.5 mM.) of abs. triethylamine are added dropwise to the solution with cooling and stirring. After 30 minutes the separated triethylamine salt is filtered off. 8.55 g. (91%) of triethylamine salt are obtained. 15.4 g. (68.5 mM.) of N-carbobenzoxy-aminooxy-acetic acid and 15.55 g. (75.5 mM.) of dicyclohexyl-carbodiimide are added to the filtrate under cooling, and the mixture is left stand overnight. 1.5 ml. of glacial acetic acid are added to the reaction mixture, and the separated dicyclohexyl urea is filtered off. 14.0 g. (83%) of dicyclohexyl urea are obtained. The filtrate is evaporated to dryness under reduced pressure, the residue is dissolved in 350 ml. of ethyl acetate, and the solution is washed with 3 x 100 ml. of 2 N sodium hydroxide solution. The aqueous layer is neutralized with cc. hydrochloric acid under cooling and stirring, and the resulting solution is extracted with 3 x 100 ml. of ethyl acetate. The ethyl acetate solutions are combined, dried and evaporated to dryness under reduced pressure. The residue is crystallized from a mixture of chloroform and petroleum ether. 15.9 g. (64%) of N-(N'-carbobenzoxy-aminooxy-acetyl)-O-p-chlorobenzyl-hydroxylamine are obtained. The physical constants of the product are identical to that of the compound obtained in Method a/1.

Method a/3: 2.25 g. (10 mM.) of N-carbobenzoxy-aminooxy-acetic acid are dissolved in 15 ml. of abs. dimethylformamide, and the solution is cooled to −10° C. 1.4 ml. (10 mM.) of abs. triethylamine and 1.3 ml. (10 mM.) of chlorocarbonic acid isobutylester are added dropwise to the stirred solution, and the reaction mixture is stirred for additional 15 min. at −10° C. Thereafter 1.94 g. (10 mM.) O-p-chlorobenzyl-hydroxylamine-hydrochloride and 1.4 ml. (10 mM.) of abs. triethylamine are added to the mixture, and the mixture is allowed to warm to room temperature during 30 minutes with stirring. 10 ml. of water and 40 ml. of 2 N sodium hydroxide are added to the mixture, and the mixture is extracted with 2 x 15 ml. of ethyl acetate. The aqueous layer is neutralized with hydrochloric acid under cooling and stirring. Thereafter it is extracted with 3 x 15 ml. of ethyl acetate. The organic phase is dried, evaporated to dryness under reduced pressure, and the residue is crystallized from ethyl acetate. 1.65 g. of N-(N'-carbobenzoxy-aminooxy-acetyl)-O-p-chlorobenzyl-hydroxylamine are obtained. The product is identical to the compound obtained in Method a/1.

Step B. N-aminooxy-acetyl-O-p-chlorobenzyl-hydroxylamine-hydrobromide 59.78 g. (164 mM.) of N-(N'-carbobenzoxyaminooxy-acetyl)-O-p-chlorobenzyl-hydroxylamine are suspended in 60 ml. of glacial acetic acid. The moisture of the air is excluded, and 240 ml. of 5 M glacial acetic solution of hydrogen bromide is added with stirring. The mixture is stirred for additional 30 minutes at room temperature, and the product is precipitated with 2 l. of abs. ether. The product is crystallized from the mixture of 750 ml. of abs. ethanol and 2.2 l. of abs. ether. 42.85 g. (84%) of N - aminooxy-acetyl-O-p-chlorobenzylhydroxylamine hydrobromide are obtained, M.P.: 165–166° C.

*Analysis.*—Calculated (percent): C, 34.8; H, 3.9; N, 9.0; Cl, 11.4; Br, 25.7. Found (percent): C, 34.8; H, 4.0; N, 9.0; Cl, 11.4; Br, 25.7.

EXAMPLE 2

Step A. N-(N'-carbobenzoxy-aminooxy-acetyl)-O-ethyl-hydroxylamine

Method a/1: 2.48 g. (11 mM.) of N-carbobenzoxy-aminooxy-acetic acid are dissolved in 25 ml. of abs. dimethylformamide, thereafter 0.97 g. (10 mM.) of O-ethyl-hydroxylamine hydrochloride, 1.4 ml. (10 mM.) of abs. triethylamine and 2.26 g. (11 mM.) of dicyclohexylcarbodiimide are added to the solution with stirring and cooling. The reaction mixture is left standing at room temperature overnight. The separated dicyclohexyl urea is filtered off, and the filtrate is evaporated to dryness under reduced pressure. The residue is dissolved in 20 ml. of ethyl acetate, and the solution is extracted with 3 x 7 ml. of 2 N sodium hydroxide. The aqueous solution is neutralized with cc. hydrochloric acid under cooling and stirring, and the neutral solution is extracted with 3 x 10 ml. of ethyl acetate. The organic solution is dried and evaporated to dryness under reduced pressure, and the residue is crystallized from the mixture of ethyl acetate and petroleum ether. 1.62 g. (61%) of N-(N'-carbobenzoxy-aminooxy-acetyl)-O-ethyl-hydroxylamine are obtained, M.P.: 69–70° C., $R_f$: 0.32.

*Analysis.*—Calculated (percent): C, 53.7; H, 6.0. Found (percent): C, 53.7; H, 6.1.

Method a/2: 4.73 g. (10 mM.) of N-carbobenzoxy-aminooxy-acetic acid pentachlorophenyl ester are dissolved in 40 ml. of abs. dimethylformamide, thereafter 1.17 g. (12 mM.) of O-ethylhydroxylamine hydrochloride and 1.66 ml. (12 mM.) of abs. triethylamine are added to the solution with stirring and cooling. The reaction mixture is left to stand at room temperature, thereafter it is worked up as described in Method a/1. 1.78 g. (67%) of N - (N' - carbobenzoxy-aminooxy-acetyl)-O-ethyl-hydroxylamine are obtained. The product is identical to the compound obtained in Method a/1.

Step B. N-aminooxy-acetyl-O-ethyl-hydroxylamine hydrobromide

The process described in Example 1, Step B is repeated with the difference that 0.62 g. of N-(N'-carbobenzoxy-aminooxy-acetyl)-O-ethyl-hydroxylamine is used in the place of N - (N' - carbobenzoxy-aminooxy-acetyl)-O-p-chlorobenzyl-hydroxylamine. 0.43 g. (87%) of N-aminooxy-acetyl-O-ethyl-hydroxylamine hydrobromide are obtained, M.P. 127° C.

*Analysis.*—Calculated (percent): C, 22.3; H, 5.1; Br, 37.2. Found (percent): C, 22.2; H, 5.0; Br, 37.1.

EXAMPLE 3

Step A. N-(N'-t-butyloxycarbonyl-aminooxy-acetyl)-O-n-dodecyl-hydroxylamine 2.39 g. (10 mM.) of O-n-dodecyl-hydroxylamine hydrochloride are dissolved in 25 ml. of abs. dimethylformamide, and 1.38 ml. (10 mM.) of abs. triethylamine are added to the solution at 0° C. After 30 minutes the separated 1.25 g. (91%) of triethylamine salt are filtered off, and 2.1 g. (11 mM.) of N-tert.-butoxycarbonyl-aminooxy-acetic acid and 2.26 g. (11 mM.) of dicyclohexylcarbodiimide are added to the filtrate with stirring and cooling. The mixture is left standing for 4 hours, thereafter the separated dicyclohexyl urea (1.98 g., 81%) is filtered off, and the filtrate is evaporated to dryness under reduced pressure. The residue is dissolved in 30 ml. of ethyl acetate, and the solution is washed successively with 10 ml. of water, 2 x 10 ml. of 1 M $Na_2CO_3$ solution and again with 10 ml. of water. The organic solution is dried and evaporated to dryness under reduced pressure. The residue is crystallized from ethyl acetate. 2.95 g. (79%) of N-(N'-tert.-butoxycarbonyl-aminooxy-acetyl) - O - n - dodecyl-hydroxylamine are obtained, M.P.: 116–118° C., $R_f$: 0.64.

*Analysis.*—Calculated (percent): C, 61.0; H, 10.2. Found (percent): C, 61.1; H, 10.2.

Step B. N-aminooxy-acetyl-O-n-dodecyl-hydroxylamine hydrochloride 1.95 g. (5.2 mM.) of N-(N'-tert.-butoxycarbonyl-aminooxy-acetyl)-O-n-dodecyl-hydroxylamine are dissolved in 7 ml. of abs. ethyl acetate, 7 ml. of 4 M ethyl acetate solution of hydrochloric acid are added to the solution at room temperature, and the resulting solution is stirred for 30 minutes. The separated crystals are filtered off, washed with abs. ether, and recrystallized from a mixture of ethanol and ether. 1.45 g. (95%) of N-aminooxy-acetyl-O-n-dodecyl-hydroxylamine hydrochloride are obtained, M.P.: 125–126° C.

*Analysis.*—Calculated (percent): C, 52.8; H, 9.9; Cl, 11.9. Found (percent): C, 52.7; H, 10.0; Cl, 11.9.

EXAMPLE 4

Step A. N-[N'-(N''-carbobenzoxy-aminooxy-acetyl)-aminooxy-acetyl]-O-p-chloro-benzyl-hydroxylamine 0.6 g. (2.6 mM.) of N-aminooxy-acetyl-O-p-chlorobenzyl hydroxylamine and 1.14 g. (2.4 mM.) of N-carbobenzoxy-aminooxy-acetic acid pentachlorophenyl ester are reacted as described in Example 1, Method a/1. The reaction mixture is worked up according to the cited example. 0.76 g. (72%) of N-[N'-(N''-carbobenzoxy-aminooxy-acetyl) - aminooxy-acetyl]-O-p-chlorobenzyl-hydroxylamine are obtained, M.P.: 70–73° C., $R_f$: 0.34.

*Analysis.*—Calculated (percent): C, 52.1; H, 4.6; N, 9.6; Cl, 8.1. Found (percent): C, 52.0; H, 4.7; N, 9.6; Cl, 8.1.

Step B. N-(N'-aminooxy-acetyl)-aminooxy-acetyl-O-p-chlorobenzyl-hydroxylamine hydrochloride 2.5 g. (8 mM.) of N-aminooxy-acetyl-O-p-chloro-benzyl-hydroxylamine hydrobromide are suspended in 40 ml. of dry dioxane, and 1.1 ml. (8 mM.) of triethylamine are added to the mixture with stirring. After 15 minutes the separated triethylamine hydrobromide is filtered off, 3.16 g. (7.2 mM.) of N-tert.-butyloxycarbonyl-aminooxy-acetic acid pentachlorophenyl ester are added to the filtrate, and the mixture is left standing at room temperature overnight. Thereafter the solvent is distilled off under reduced pressure, the residue is dissolved in 30 ml. of ethyl acetate, and the ethyl acetate solution is washed successively with 4 x 5 ml. of 1 N hydrochloric acid and 2 x 5 ml. of water. The organic solution is dried, the solvent is distilled off under reduced pressure, and the obtained 3.9 g. of oily residue is treated with a 4 M ethyl acetate hydrochloric acid solution as described in Example 2, Step B. 1.65 g. (87%) of N-(N'-aminooxy-acetyl)-aminooxy-acetyl - O-p - chloro-benzyl-hydroxylamine hydrochloride are obtained. This compound melts at 164–166° C. after recrystallization from a mixture of ethanol and ether.

*Analysis.*—Calculated (percent): C, 38.8; H, 4.5; Cl, 20.9. Found (percent): C, 38.6; H, 4.6; Cl, 20.8.

EXAMPLE 5

Step A. N-[N'-(N''-carbobenzoxy-glycyl)-aminooxy-acetyl]-O-p-chlorobenzyl-hydroxylamine 0.45 g. (2 mM.) of N-aminooxy-acetyl-O-p-chlorobenzyl-hydroxylamine and 0.82 g. (1.8 mM.) of N-carbobenzoxyglycine pentachlorophenyl ester are reacted as described in Example 1, Method a/1. The reaction mixture is worked up according to the cited example. 0.56 g. (74%) of N-[N'-(N''-carbobenzoxyglycyl)-aminooxy-acetyl]-O-p-chloro-benzyl-hydroxylamine are obtained, M.P. 140–143° C., $R_f$: 0.3.

*Analysis.*—Calculated (percent): C, 54.2; H, 4.8; N, 10.0; Cl, 8.4. Found (percent): C, 54.2; H, 4.8; N, 10.0; Cl, 8.4.

Step B. N-[N'-glycyl)-aminooxy-acetyl]-O-p-chloro-
benzyl-hydroxylamine hydrobromide 0.36 g. (0.9 mM.) of N-[N'-(N''-carbobenzoxy-glycyl)-aminooxy-acetyl] - O-p - chlorobenzyl-hydroxylamine are dissolved in 2.0 ml. of a 4 M glacial acetic acid solution of hydrobromic acid with stirring and excluding the moisture of air. After 45 minutes the product is precipitated by adding 20 ml. of ether. The precipitate is filtered off, washed with abs. ether, and recrystallized from a mixture of abs. ethanol and abs. ether. 0.28 g. (85%) of N - [N'-(glycyl)-aminooxy-acetyl]-O-p-chlorobenzyl-hydroxylamine hydrobromide are obtained, M.P.: 152–154° C.

*Analysis.*—Calculated (percent): C, 35.8; H, 4.1; N, 11.4; Cl, 9.6; Br, 21.7. Found (percent): C, 35.9; H, 4.2; N, 11.5; Cl, 9.7; Br, 21.7.

EXAMPLE 6

Step A. N-(N'-tert.-butoxycarbonyl)-alpha-aminooxy-propionyl-O-p-chlorobenzyl-hydroxylamine 1.73 g. (3.8 mM.) of N-alpha-tert.-butoxycarbonyl-aminooxy-propionic acid pentachlorophenyl ester are dissolved in 15 ml. of dry dioxane, and 0.82 g. (4.2 mM.) of O-p-chlorobenzyl-hydroxylamine hydrochloride are added to the solution. The mixture is cooled to +10° C., and 0.59 ml. (4.2 mM.) of triethylamine are added dropwise to the mixture with stirring. The reaction mixture is left to stand overnight, thereafter the separated triethylamine hydrochloride is filtered off, and the solvent is distilled off from the filtrate under reduced pressure. The residue is dissolved in 10 ml. of ethyl acetate, and the organic solution is washed successively with 3 x 3 ml. of 1 N hydrochloric acid and 2 x 3 ml. of water. The ethyl acetate solution is dried and evaporated to dryness under reduced pressure. 1.2 g. of N-(N'-tert.-butoxycarbonyl) - alpha - aminooxy-propionyl-O-p-chlorobenzyl-hydroxylamine are obtained in the form of a viscous syrup.

Step B. N-(alpha-aminooxy-propionyl)-O-p-chloro-
benzyl-hydroxylamine hydrochloride 0.48 g. (1.4 mM.) of N-(N'-tert.-butoxycarbonyl-alpha-aminooxy-propionyl)-O-p-chlorobenzyl - hydroxylamine are dissolved in 4.0 ml. of a 4 M ethyl acetate hydrochloric acid solution and the mixture is stirred at room temperature for 30 minutes. Thereafter 10 ml. of dry ether are added to the mixture, the separated crystals are filtered off, and recrystallized from a mixture of abs. ethanol and ether. 0.34 g. (87%) of N-(alpha-aminooxy-propionyl)-O-p-chlorobenzyl - hydroxylamine hydrochloride are obtained, M.P.: 197–201° C., $(\alpha)_D = +58°$ (c.=1, in EtOH).

*Analysis.*—Calculated (percent): C, 42.8; H, 5.0; Cl, 25.2. Found (percent): C, 42.8; H, 5.0; Cl, 25.2.

EXAMPLE 7

N-aminooxy-acetyl-O-p-nitrobenzyl-hydroxylamine
hydrochloride 2.25 g. (0.011 M) of O-p-nitrobenzyl-hydroxylamine hydrochloride are dissolved in 30 ml. of abs. dioxane. 1.54 ml. (0.011 M) of triethylamine are added to the solution, and the separated triethyl ammoniumchloride is filtered off. 4.39 g. (0.010 M) of N-tert.-butoxycarbonyl-aminooxy-acetic acid pentachlorophenyl ester are added to the filtrate, and the reaction mixture is left to stand for 16 hours at room temperature. The solvent is distilled off under reduced pressure in a water bath heated to +50° C., the residue is dissolved in 40 ml. of ethyl acetate, and the obtained solution is washed successively with 10 ml. of 1 M sodium hydrocarbonate solution, 10 ml. of water, 3 x 10 ml. of 0.1 N hydrochloric acid and finally 10 ml. of water. The organic solution is dried over sodium sulfate, thereafter the solvent is distilled off under reduced pressure. The residue is dissolved in 10 ml. of a 4 N ethyl acetate hydrochloric acid solution, and the solution is stirred for 20 minutes at room temperature with the exclusion of the moisture of air. 20 ml. of abs. diethyl ether are added to the mixture, the separated crystals are filtered off and recrystallized from a mixture of ethanol and diethyl ether. 1.72 g. (62%) of N - aminooxy - acetyl-O-p-nitrobenzyl-hydroxylamine hydrochloride are obtained, M.P.: 176–180° C., $R_f$: 0.18.

*Analysis.*—Calculated (percent): C, 39.0; H, 4.4; Cl, 12.8. Found (percent): C, 39.2; H, 4.5; Cl, 12.9.

EXAMPLE 8

N-aminooxy-acetyl-O-benzyl-hydroxylamine
hydrochloride 4.39 g. (0.010 M) of N-tert.-butoxycarbonyl-aminooxy-acetic acid pentachlorophenyl ester and 1.75 g. (0.011 M) of O-benzyl-hydroxylamine hydrobromide are reacted as described in Example 7. 1.80 g. (77.5%) of N-aminooxy-acetyl-O-benzyl-hydroxylamine hydrochloride are obtained, M.P.: 163–165° C., $R_f$: 0.21.

*Analysis.*—Calculated (percent): C, 46.5; H, 5.6; Cl, 15.3. Found (percent): C, 46.5; H, 5.8; Cl, 15.2.

EXAMPLE 9

Step A. N-(N''-alpha-tert.-butoxycarbonyl-aminooxy-
beta-phenyl-propionyl)-O-ethyl-hydroxylamine 3.28 g. (0.0062 M) of N-alpha-tert.-butoxycarbonyl-aminooxy-beta-phenyl-propionic acid pentachlorophenyl ester and 0.64 g. (0.0065 M) of O-ethyl-hydroxylamine hydrochloride are reacted as described in Example 7. The crude product is recrystallized from a mixture of ethyl acetate and n-heptane. 1.45 g. (73%) of N-(N''-alpha - tert. - butoxycarbonyl-aminooxy-beta-phenyl-propionyl)-O-ethyl-hydroxylamine are obtained, M.P.: 94° C., $[\alpha]_D^{25} = +64°$ (c.=1, ethanol), $R_f = 0.63$.

*Analysis.*—Calculated (percent): C, 59.2; H, 7.4. Found (percent): C, 59.1; H, 7.5.

Step B. N-alpha-aminooxy-beta-phenyl-propionyl-O-
ethyl hydroxylamine hydrochloride 0.95 g. (0.0029 M) of N-(N''-alpha-tert.-butoxycarbonyl-aminooxy-beta-phenyl-propionyl)-O-ethyl - hydroxylamine are reacted with 6.0 ml. of a 4.0 N ethyl acetate hydrochloric acid solution as described in Example 7. 0.67 g. (90.5%) of N-alpha-aminooxy-beta-phenyl-propionyl-O-ethyl hydroxylamine hydrochloride are obtained, M.P.: 149–152° C., $[\alpha]_D^{25} = +25°$ (c.=0.5, ethanol).

*Analysis.*—Calculated (percent): C, 51.8; H, 4.7; Cl, 13.9. Found (percent): C, 51.8; H, 4.8; Cl, 13.9.

EXAMPLE 10

N-alpha-aminooxy-beta-phenyl-propionyl-O-n-
dodecyl hydroxylamine hydrochloride 3.28 g. (0.0062 M) of alpha-n-tert.-butoxycarbonyl-aminooxy-beta-phenyl-propionic acid pentachlorophenyl ester are reacted with 1.55 g. (0.0065 M) of O-n-dodecyl-hydroxylamine hydrochloride as described in Example 7. 2.03 g. (82%) of N-alpha-aminooxy-beta-phenyl-propionyl-O-n-dodecyl hydroxylamine hydrochloride are obtained, M.P.: 147–152° C., $[\alpha]_D^{25} = +15.0°$ (c.=0.9, 95% ethanol).

*Analysis.*—Calculated (percent): C, 62.9; H, 9.3; Cl, 8.8. Found (percent): C, 62.8; H, 9.4; Cl, 8.9.

EXAMPLE 11

N-DL-aminooxy-phenylacetyl-O-p-chlorobenzyl-
hydroxylamine hydrochloride 1.70 g. (0.003 M) of DL-N-tert.-butoxycarbonyl-aminooxy-phenylacetic acid pentachlorophenyl ester are reacted with 0.64 g. (0.0033 M) of O-p-chlorobenzyl-hydroxylamine hydrochloride as described in Example 7. 0.80 g. (77%) of DL-N-aminooxy-phenylacetyl-O-p-chlorobenzyl-hydroxylamine hydrochloride are obtained, M.P.: 215–218° C.

*Analysis.*—Calculated (percent): C, 52.5; H, 4.7; N, 8.2; Cl, 20.6. Found (percent): C, 52.5; H, 4.8; N, 8.1; Cl, 20.7.

EXAMPLE 12

N-(N'-glycyl)-aminooxy-acetyl-O-p-nitrobenzyl-hydroxylamine hydrochloride 0.55 g. (0.002 M) of N-aminooxy-acetyl-O-p-nitrobenzyl-hydroxylamine hydrochloride are reacted with 0.76 g. (0.0018 M) of N-tert.-butoxycarbonyl-glycine pentachlorophenyl ester as described in Example 7. 0.46 g. (70%) of N-(N'-glycyl)-aminooxy-acetyl-O-p-nitrobenzyl-hydroxylamine hydrochloride are obtained, M.P.: 234–236° C.

*Analysis.*—Calculated (percent): C, 39.5; H, 4.5; N, 16.8; Cl. 10.6. Found (percent): C, 39.5; H, 4.6; N, 16.9; Cl, 10.5.

EXAMPLE 13

N-(N'-carbamoyl)-aminooxy-acetyl-O-p-chlorobenzyl-hydroxylamine 3.11 g. (0.010 M) of N-aminooxy-acetyl-O-p-chlorobenzyl-hydroxylamine hydrobromide are dissolved in 10 ml. of water. The solution is cooled to +5° C., 10 ml. of 1 N hydrochloric acid are added to the mixture, then 0.90 g. (0.011 M) of KOCN are added portionwise, during 15 minutes. The mixture is stirred for 30 minutes at room temperature, thereafter the separated crystals are filtered off and washed with water. 2.15 g. (79%) of crude product are obtained, M.P. 121–123° C. The crude product is recrystallized from hot ethanol. 1.90 g. (69.5%) of pure N-(N'-carbamoyl)-aminooxy-acetyl-O-p-chlorobenzyl-hydroxylamine are obtained, M.P.: 130–132° C.

*Analysis.*—Calculated (percent): C, 44.0; H, 4.4. Found (percent): C, 43.9; H, 4.4.

EXAMPLE 14

N-(N'-acetyl)-aminooxy-acetyl-O-p-chlorobenzyl-hydroxylamine 3.11 g. (0.010 M) of N-aminooxy-acetyl-O-p-chlorobenzyl hydroxylamine hydrobromide are dissolved in 25 ml. of abs. pyridine. The mixture is cooled to +5° C. (inside temperature), and 140 ml. of triethylamine are added. Finally 0.80 ml. (0.0113 M) of acetylchloride are added dropwise, within 20 minutes, to the mixture, and the mixture is stirred for an additional hour at room temperature. The mixture is diluted with 75 ml. of water, and extracted successively with 50 ml. and 2 x 25 ml. of ethyl acetate. The organic phases are combined, washed with 2 x 20 ml. of water, dried over sodium sulfate, and the solvent is distilled off under reduced pressure. The residue is recrystallized from ethyl acetate. 2.07 g. (76.5%) of N-(N'-acetyl)aminooxy-acetyl-O-p-chlorobenzyl-hydroxylamine are obtained. M.P.: 103–104° C., $R_f$: 0.52.

*Analysis.*—Calculated (percent): C, 48.8; H, 4.1; N, 10.4. Found (percent): C, 48.7; 4.2; N, 10.3.

What we claim is:

1. A compound of the general Formula I

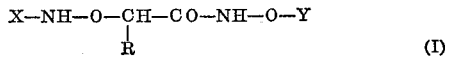

wherein

X represents a hydrogen atom or an acetyl group,

R represents a hydrogen atom, methyl group, benzyl group, or phenyl group,

Y represents a benzyl group unsubstituted or substituted with halogen or a nitro group, or an alkyl group of 1–15 carbon atoms, as well as the HCl and HBr addition salts of the compounds of the General Formula I.

2. N-aminooxy-acetyl-O-p-chlorobenzyl-hydroxylamine and its HCl and HBr addition salts.

References Cited

UNITED STATES PATENTS

| | | | |
|---|---|---|---|
| 3,420,824 | 1/1969 | Ellis | 260—453 R |
| 3,621,055 | 11/1971 | Fischer et al. | 260—453 R |
| 3,457,063 | 7/1969 | Neighbors | 260—453 R |
| 3,444,232 | 5/1969 | Bernstein | 424—298 |
| 3,551,462 | 12/1970 | Seki et al. | 424—320 |

OTHER REFERENCES

Severin et al. "Conformational inhibitors of pyridoxal phosphate etc.," CA70 No. 9027 s. (1969).

Gale, "Further studies of the antimycobacterial agents, etc." (1966) CA 64, p. 11587 (1966).

Schroder et al. "The Peptides" (1965).

Academic Press, New York, vol. 1, pp. 22–25, 36–39, 72 and 73 (1965).

LEWIS GOTTS, Primary Examiner

G. HOLLRAH, Assistant Examiner

U.S. Cl. X.R.

260—349, 482 R, 482 C; 424—298